(12) United States Patent
Hansen et al.

(10) Patent No.: US 6,323,993 B1
(45) Date of Patent: Nov. 27, 2001

(54) METHOD OF OPTICAL SIGNAL TRANSMISSION WITH REDUCED DEGRADATION BY NON-LINEAR EFFECTS

(75) Inventors: Per Bang Hansen, Bradley Beach; Torben N. Nielsen, Monmouth Beach; Andrew John Stentz, Clinton, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,665

(22) Filed: Feb. 19, 1999

(51) Int. Cl.[7] ............................... H01S 3/10; G02F 1/00
(52) U.S. Cl. ............................. 359/337; 359/341; 372/6
(58) Field of Search ........................... 359/337, 341, 359/345, 334, 124, 161; 385/3, 5, 122; 372/21, 69

(56) References Cited

U.S. PATENT DOCUMENTS 6,038,356 * 3/2000 Kerfoot, III et al. .................. 385/24

OTHER PUBLICATIONS

Forghieri, et al., Optical Fiber Telecommunications vol. IIIA, 1997, pp. 196–265.*
Jinno et al., "WDM Transmission Technologies for Dispersion–Shifted Fibers", Aug. 1998, IEICE Trans. Electron, vol.E81–C, No. 8, pp. 1264–1275.*
J.R. Simpson, et al., "A Distributed Erbium Doped Fiber Amplifier", *Proc. OFC*, pp. PD19–1 to PD19–4, (1990).
E. Desurvire, Erbium–Doped Fiber Amplifiers, Section 2.6, pp. 121–136.
U.S. Patent application Ser. No. 09/233,318, filed on Jan. 19, 1999.
U.S. Patent application Ser. No. 08/659,607, filed on Jun. 6, 1996.
U.S. Patent application Ser. No. 09/153,605, filed on Sep. 15, 1998.

* cited by examiner

*Primary Examiner*—Thomas H. Tarcza
*Assistant Examiner*—Deandra M. Hughes
(74) *Attorney, Agent, or Firm*—Martin I. Finston

(57) ABSTRACT

In an optical communication system, the signal power level injected into each of one or more optical fiber spans is reduced so as to suppress undesired non-linear effects. This reduction in injected signal level is made possible by remotely pumped amplification in the spans that are affected.

17 Claims, 3 Drawing Sheets

METHOD OF OPTICAL SIGNAL TRANSMISSION WITH REDUCED DEGRADATION BY NON-LINEAR EFFECTS

FIELD OF THE INVENTION

This invention relates to optical communication systems whose performance is susceptible to degradation by non-linear optical effects. More particularly, the invention relates to systems that, moreover, employ wavelength division multiplexing (WDM).

ART BACKGROUND

With reference to FIG. 1, a typical optical fiber communication system includes a source 10 of information-carrying optical signals, and an optical fiber transmission line 15 for transporting the signals to at least one optical receiver 20. Where long-haul transmissions are contemplated, e.g., transmissions over distances on the order of one hundred kilometers or more, it is typical to include repeaters 25 for signal recovery and amplification. A fiber span 30 extends between each adjacent pair of repeaters, and typically also from the source to the first repeater. It is frequent practice for each fiber span to be terminated, within a repeater, by an optical amplifier 35, 40. Such an optical amplifier is typically a discrete, or locally pumped, amplifier, in the sense that the source of pump radiation is co-located with the gain medium. A typical such discrete amplifier 35 consists of a section of erbium-doped optical fiber, coupled to a semiconductor laser as a source of pump radiation.

It should be noted that the last discrete amplifier before receiver 20 (represented in the figure as amplifier 40) is often better characterized as a "preamplifier" than as a "repeater amplifier," because its primary function will often be to condition the arriving signal for reception, rather than to relay it onto a further span.

To improve economy by increasing the distance between adjacent repeaters, there has been growing interest in the use of distributed amplification in addition to discrete amplification. Amplification is said to be "distributed" if it takes place over an extended distance, and the resulting gain is, e.g., just enough to compensate for fiber loss over such distance, or in any event is of an order smaller than 0.1 dB per meter.

A distributed amplifier is typically remotely pumped, in the sense that the source of pump radiation is not co-located with the gain medium. For example, the gain medium for a Raman amplifier will often be the core of the optical fiber making up a span 30. (No doping with optically active species is necessary to make the core an effective gain medium for that purpose.) Pump radiation from a remotely situated source 50 is coupled into a span 30 from a fiber segment 55. Although not necessarily required, it is often convenient to house source 50 within the repeater just following the span to be pumped, as shown in FIG. 1. Raman pump sources are typically semiconductor lasers.

Raman amplification is described, for example, in U.S. patent application Ser. No. 08/659,607, filed on Jun. 6, 1996 by L. E. Eskildsen et al. under the title, "System and Method of Upgrading Transmission Capacity by Raman Amplification." Other forms of remotely pumped, distributed amplification, alternative to Raman amplification, have also been proposed. For example, low levels of erbium doping can be included within the cores of the optical fibers that make up fiber spans, and pumping provided from remote locations such as the repeaters. Such a technique is described, for example, in J. R. Simpson et al., "A Distributed Erbium Doped Fiber Amplifier," Paper PD-19, *Proc. OFC* 1990, pages PD19-1 to PD 19-4. Distributed erbium-doped amplifiers are also described in E. Desurvire, *Erbium-Doped Fiber Amplifiers*, Section 2.6, pages 121–136.

Additionally, it should be noted that remotely pumped amplification is not necessarily "distributed," but instead can be lumped amplification. Amplification of this kind can be implemented, for example, by remotely pumping a section of erbium-doped fiber having a moderate or high level of doping.

In response to increasing demand for information-handling capacity in optical fiber communication systems, various multiplexing techniques have been introduced. In the technique referred to as Wavelength-Division Multiplexing (WDM), multiple wavelength channels are combined on a single optical fiber. Typically, a respective optical source, such as a diode-pumped laser, is provided for each wavelength channel. A modulation device is provided for patterning the optical output from each such source. (Alternatively, the sources are directly driven by modulated signals.) Each wavelength channel potentially contains an optical carrier frequency that has been modulated to encode information. Modulation means any method for imposing data on the optical carrier, and includes, for example, amplitude modulation, frequency modulation, and phase-shift keying. A wavelength channel has a finite frequency width, which typically ranges from hundreds of MHz to tens of GHz.

The various wavelength channels are generally clustered about a central communication wavelength such as 1550 nm. For example, the International Telecommunications Union (ITU) has proposed a standard grid of wavelength channels spaced by 100 GHz and including the wavelength that corresponds to a frequency of 193.1 THz. (A channel spacing, in frequency, of 100 GHz is equivalent to a spacing in wavelength of about 0.8 nm.)

Certain difficulties arise in optical communications because of so-called non-linear effects, which arise through interactions between lightwaves of relatively high power and the transmission medium. These effects are undesirable because they can degrade the performance of the system. Although these effects occur generally in optical communication systems, they are most prevalent in WDM systems. Among WDM systems, these effects tend to be most prevalent in those systems in which there are at least ten wavelength channels, and the channel spacing is twenty times the data rate, or less.

One such non-linear effect is known as four-wave mixing. This effect tends to occur between neighboring channels, and it occurs especially in optical fibers having low dispersion within the signal band, i.e., within the range of signal wavelengths. Another such effect is cross-phase modulation. This effect also takes place as a result of interactions between different (but not necessarily adjacent) channels. However, cross-phase modulation is especially troublesome in fibers having relatively high dispersion within the signal band. Yet another non-linear effect is self-phase modulation. This effect tends to cause signal distortion within individual wavelength channels. Yet another non-linear effect is stimulated Brillouin scattering (SBS). SBS, which causes backscatter within individual wavelength channels, is especially troublesome in analog systems, where it can be a significant factor in limiting system performance.

A variety of techniques have been employed to reduce or avoid the degradation associated with nonlinear effects. For example, dispersions typically in the range of 1.5 to 8 ps/km/nm are introduced into the fiber to reduce the consequences of four-wave mixing.

However, there remains a need for optical fiber transmission systems that can handle high-capacity communications while reducing the deleterious consequences of non-linear effects.

SUMMARY OF THE INVENTION

Non-linear effects remain a serious problem for high-performance optical communication systems. For example, as bit rates increase, average optical power levels increase as well. Because non-linear effects grow rapidly with power levels, these effects can limit the performance attainable by high-bit-rate systems. Moreover, even when optical fiber with selected dispersion characteristics is used, four-wave mixing can place limits on the channel density. In cases where it is necessary to continue using already installed, low-dispersion fiber, four-wave mixing can pose even greater difficulties.

Our invention involves a method, and related system, for optical communication. We have discovered that by using a defined reduction in the power level injected into each of one or more optical fiber spans, undesired non-linear effects can be suppressed and the system performance can be improved. The defined reduction is made possible by remotely pumped amplification in the affected span or spans. That is, remotely pumped amplification facilitates a reduction in span launch power, and as a consequence, it leads to a reduction of penalties from fiber nonlinearities.

In specific embodiments, our invention substantially enhances the number of channels that it is possible to employ in an optical communication system by using specific amplification properties. Specifically, we have found that non-linear interactions that degrade system performance, and thus limit the number of channels, are mitigated by using specific remotely pumped amplification schemes configured within a specific parameter regime. These schemes share the broad feature of controlling the power level of the signal, as it propagates through the optical communication system, in such a way that the accumulated non-linear effects are insufficient to substantially degrade the exiting signal.

In one aspect, our invention involves a method of amplifying a wavelength-division multiplexed signal occupying one or more wavelength channels, to be carried out within a communication system that comprises one or more optical fiber spans. The signal is subjected to remotely pumped amplification in at least one of the spans.

The signal enters each remotely pumped (RP) span with a respective entry log power level $P_i$. The remotely pumped amplification is carried out in each RP span so as to impart to the signal at least a target signal-to-noise ratio (SNR) at the end of that span, and for the purpose of producing the target value, the remotely pumped amplification (in a given span) is equivalent to boosting the entry log power level $P_i$ by a respective increment $\Delta P$ without adding noise. By "target level" is meant simply some level within the operating range of the system.

By way of example, the increment $\Delta P$ may be measured by turning off the remotely pumped amplification and boosting $P_i$ until the original SNR is reached (if at all). The amount by which $P_i$ was boosted is $\Delta P$. The SNR referred to here may be measured in any of various ways.

A figure of merit can be assigned, to describe the signal as output by the communication cable. Exemplarily, this figure of merit is a respective quality factor Q for each of the wavelength channels. The well-known Q parameter, which relates signal interpretation to signal statistics, is described in the above-cited book by E. Desurvire at page 178.

We introduce certain terminology for descriptive purposes. According to our terminology, the output quality is said to be degraded if, in any wavelength channel, Q decreases by more than 2 dB, or equivalently, by more than 37%. Further in accordance with our terminology, an RP span is said to be power-compensated if the remotely pumped amplification in that span is turned off, and instead, the entry log power level of that span is boosted to $P_i+\Delta P$ in the one or more wavelength channels.

One distinguishing feature of our method is that the remote pumping is carried out in such a way that non-linear effects are substantially suppressed, relative to other methods that seek to maintain adequate output optical power levels. As a consequence, power-compensating any sequence of one or more RP spans, beginning with the last RP span and proceeding in reverse order, causes the output quality to be degraded, or fails to restore the target power level at the end of at least one span.

DETAILED DESCRIPTION

In current practice, high-capacity optical transmission systems employing dense wavelength-division multiplexed (DWDM) signals generally include optical fiber having some amount of dispersion sufficient to suppress non-linear effects such as four-wave mixing. (A WDM system is considered to be "dense" if the frequency spacing between any two adjacent channels is less than or equal to 200 times the data rate of those channels.) Accordingly, these systems often use so-called non-zero dispersion shifted fibers (NZDSF) in which the zero-dispersion wavelength lies outside the signal-wavelength band. However, a significant amount of zero-dispersion dispersion shifted fiber (ZDSF)

has already been installed. There are strong economic incentives for transmitting DWDM signals on this installed fiber, even though the signal band overlaps or falls close to the zero-dispersion wavelength.

One illustrative embodiment of our invention has particular utility in connection with fiber installations of this kind. According to such embodiment, an optical fiber transmission system includes a source of optical DWDM signals, a receiver, and a series of optical fiber spans for carrying the optical signals to the receiver. In accordance with known design principles, the source is effective for generating optical radiation in each of multiple wavelength channels, exemplarily the channels of the ITU wavelength grids described above, modulating the radiation in each channel, and multiplexing the modulated radiation in all of the channels onto a single optical fiber. Modulation for such purpose is exemplarily provided by a Mach-Zehnder modulator for each channel. Alternatively, the radiation sources may be driven directly by a modulated signal.

Each of the optical fiber spans comprises a length of dispersion shifted fiber. It is acceptable for the zero-dispersion wavelength in some, and even in all, of the spans to lie within or very close to the signal band. The length of a typical span is 80–100 km. We believe that the principles of the invention as here described will be operative, and practical utility will result, even in spans one hundred kilometers or more in length. The same principles will also apply in spans substantially less than 80 km in length, although there is less economic incentive for using spans so short. A typical number of such spans for inter-regional distances is 4–10, and for trans-oceanic distances is 200–300. For reasons to be discussed below, it is advantageous to employ fiber having a relatively high Raman efficiency. A fiber is considered to have relatively high Raman efficiency if it has an effective area of less than 70 square micrometers at the wavelength of interest.

Figure 1:
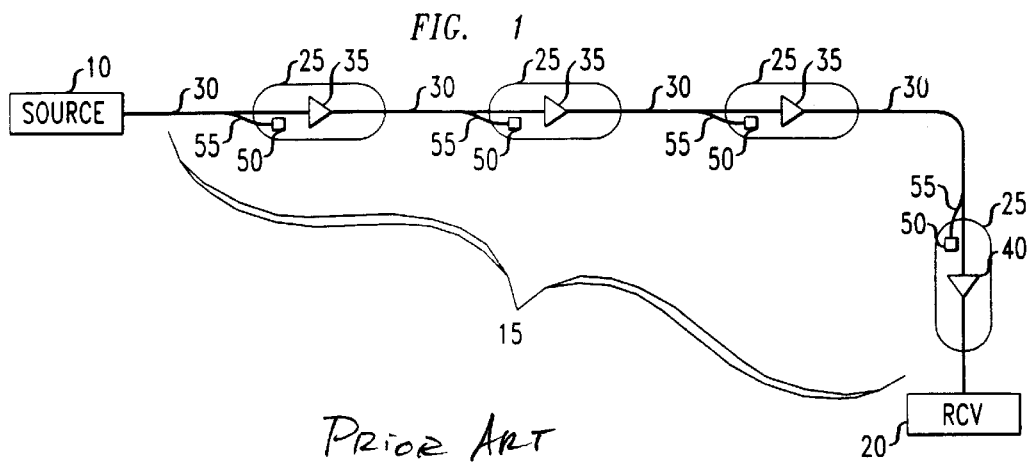
FIG. 1 is a schematic drawing of an illustrative optical fiber communication system of the prior art.
Figure 2:
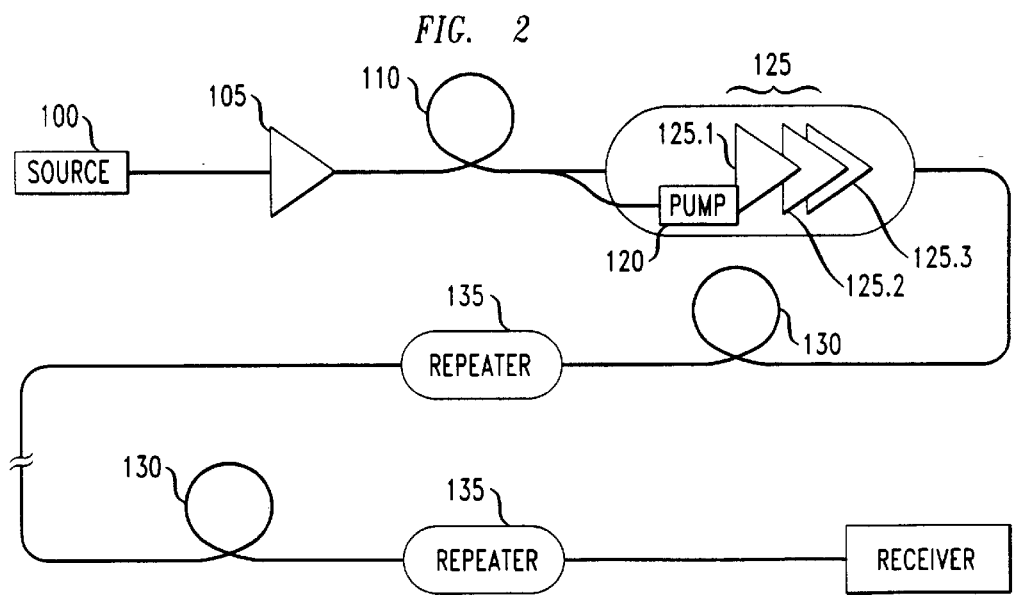
FIG. 2 is a schematic drawing of an optical fiber communication system according to an illustrative embodiment of the present invention.

Turning now to FIG. 2, in one embodiment, the optical signal from source 100 enters boost amplifier 105, which is typically a discrete, erbium-doped fiber amplifier, and then enters first fiber span 110. Fiber span 110 terminates at repeater 115. Housed within repeater 115 is a Raman pump source 120, which provides remote pumping of the fiber core in the immediately preceding fiber span 110. A typical center wavelength of the Raman pump is 1454 nm. (Those skilled in the art will appreciate that the Raman pump wavelength should lie below the wavelength band to be amplified by an effective amount, referred to as the anti-Stokes shift.)

Raman amplification in optical communication systems is described, e.g., in U.S. patent application Ser. No. 09/233,318, filed on Jan. 19, 1999 by A. J. Stentz et al., commonly assigned herewith, and in U.S. patent application Ser. No. 08/659,607, filed on Jun. 6, 1996 by L. E. Eskildsen et al., commonly assigned herewith.

Also housed within repeater 115 is an erbium-doped fiber amplifier 125, which exemplarily consists of three discrete amplifier stages 125.1–125.3, as dictated by known design principles. An exemplary maximum value for the total output power from the cascaded Raman and erbium amplifiers is 22.5 dBm. It should be noted that this is a relatively high value, and that substantially lower values would also be effective.

Gain flattening of the composite gain spectrum of the cascaded amplifiers is advantageously provided in accordance with known design principles. In fact, we have found that the gain variation over the entire signal band, and in fact over the entire range from 1532 nm to 1565 nm, can be kept to no more than 1.0 dB.

Each subsequent fiber span 130 terminates at a repeater similar to repeater 115.

We carried out experimental tests (described below) of a laboratory prototype of a system of the kind described above. In a first experiment, our prototype had a total effective length of 670.4 km divided among eight spans, each having a loss of 17.5 dB at a wavelength of 1550 nm. In the first experiment, we transmitted signals in 25 channels in the wavelength range 1541.75 nm–1561.01 nm, spaced 100 GHz apart, using 440 mW of Raman pumping in each span.

In a second experiment, our prototype had an effective length of 335.2 km divided among four spans. In the second experiment, we transmitted signals in 49 channels, in the same wavelength range, spaced 50 GHz apart, using 440 mW of Raman pumping in each span.

In the first experiment, we found that the minimum optical signal-to-noise ratio (OSNR) among the 25 channels was 22.1 dB, and that all channels exhibited a Q-value over 16.3 dB. This Q-value corresponds to a bit-error rate of $3 \times 10^{-11}$.

In the second experiment, we found that the minimum OSNR among the 49 channels was greater than 20.7 dB, and that all channels exhibited a Q-value of at least 16.3 dB. As above, these Q-values correspond to bit-error rates no greater than $3 \times 10^{-11}$.

Significantly, our use of remote pumping, in this instance for distributed Raman amplification, made it feasible to reduce the total launch power into the system to only 4.1 dBm in both experiments. This low launch power, in turn, resulted in substantial suppression of nonlinear effects, particularly of four-wave mixing. (It should be noted that in particular systems, one non-linear effect may be dominant, whereas in other systems, a combination of non-linear effects may have be significant.) In fact, the total power of all four-wave mixing products coinciding with one exemplary channel was 19.7 dB below the signal power in the first experiment (in which the channels were linearly parallel polarized, a condition which tends to aggravate four-wave mixing), and 21.9 dB below the signal power level in the second experiment (in which the channels were more closely spaced but had arbitrary relative states of polarization).

In effect, we have introduced remotely pumped amplification in the first stage of each repeater. We have found that this renders a substantial improvement in the noise performance of the system. Because of this improvement, we were able to reduce the launch power of the signal into each span enough to substantially suppress four-wave mixing and other non-linear effects.

By contrast, we believe that an equivalent system without remotely pumped amplification would suffer substantial performance degradation as a result of non-linear effects. Such degradation would be manifested, for example, in a decreased Q-value for the signal received from the system.

We believe that our use of remotely pumped amplification improves the Q-value of the entire system by at least 2 dB or, equivalently, by at least 37%. That is, we believe that power compensating all the spans of a system made according to our present teachings would lead to non-linear effects severe enough to degrade the Q-value by at least 2 dB. In fact, we believe that such degradation would often appear even without power compensating all of the spans of a multiple-span system. Instead, to bring about such degradation, it would often be sufficient to power compensate some sequence of less than all of the remotely pumped spans, beginning with the last and proceeding in reverse order.

As noted, four-wave mixing is an especially prominent non-linear effect when the fiber has low dispersion in the signal band. When such fiber is used, an alternate measure of the advantages provided by our invention is afforded by evaluating the four-wave mixing effects in each remotely pumped span. In each wavelength channel, at the end of each remotely pumped span, the power of the undesired product of four-wave mixing is divided by the signal power to form a ratio. Power compensating a span will cause this ratio to increase for each channel. These ratios can be added together to form a sum over those spans that are power compensated. In at least some systems made according to our present teachings, this sum, over all remotely pumped spans, for each individual channel, will be less than −15 dB. However, when power compensation is applied to some sequence of at least one of these spans, beginning with the last, there will be at least one channel for which this sum exceeds −15 dB.

It is well known that four-wave mixing is aggravated when channels are spaced close together, e.g. less than 200 GHz apart, and particularly when the channels are evenly spaced in frequency. Thus, it is significant that we have obtained high system performance under these very conditions, particularly since local dispersion for at least some wavelength channels was less than 3 ps/nm-km, and for at least some wavelength channels was less than 1.5 ps/nm-km.

We have described remote pumping of a Raman medium. It should be noted that alternative media, also useful in this context, can be remotely pumped. Thus, for example, remote amplification can be provided in distributed erbium (or other rare-earth-doped) fibers. In such fibers, a relatively low concentration of rare-earth dopants is included within relatively long fiber spans, i.e., spans of up to a kilometer or even more. Remote amplification can also be provided in shorter segments of more intensively doped fiber. For example, a section of erbium-doped fiber may be inserted into the fiber span, and pumped via the transmission fiber with a pump beam propagating counter to the signal. Such an arrangement may even provide simultaneous gain in the erbium-doped segment together with Raman gain in the section of transmission fiber running from the pump source to the erbium-doped segment.

It should be noted that the principles of our invention are applicable both to analog and to digital optical communication systems. Whereas the SNR and the Q factor of figures of merit commonly used in describing digital systems, other figures of merit are often used for describing the performance of analog systems. These include the carrier-to-noise ratio (CNR), the composite second-order distortion value (CSO), and the composite triple beat (CTB). These figures of merit are defined in the above-cited book by E. Desurvire at pages 196 and 202. One measure of the performance enhancement brought about by our invention as applied to an analog system would involve power compensating the spans of a comparative analog system. Power compensation would be carried out substantially as described above, except that the power increment $\Delta P$ would be a log ratio of respective CNRs, rather than of SNRs. We believe that power compensating some sequence of the remotely pumped spans of an analog system using our inventive principles, beginning with the last span and proceeding in reverse order, would bring about a degradation of at least 2 dB in at least one of the overall system CNR, CSO, or CTB.

SBS is a non-linear effect that can occur irrespective of the dispersive properties of the fiber. We believe that the principles of our invention are effective, inter alia, for suppressing SBS. For example, we believe that in systems in which the launch power into a span is more than 6 dBm in a given channel, power compensating such span will increase the reflected optical power due to SBS in that one channel to at least −15 dB.

Figure 3:
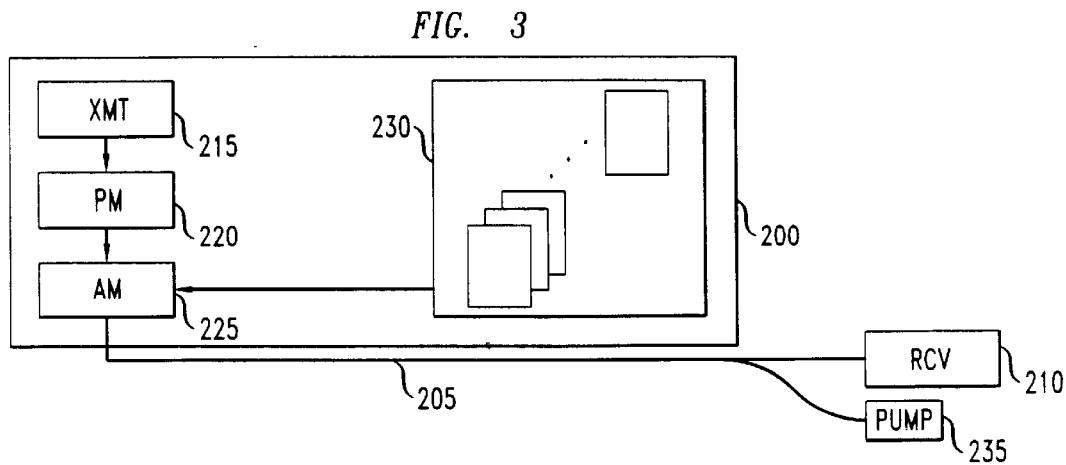
FIG. 3 is a schematic block diagram of an analog optical communication system according to an illustrative embodiment of the present invention.

FIG. 3 illustrates an exemplary analog optical communication system whose performance is substantially improved by applying the principles of the present invention to suppress SBS. Signal source 200 launches an analog optical signal into single span 205 of standard single-mode fiber, which delivers the signal to receiver 210.

By way of example, source 200 includes CATV semiconductor laser transmitter 215, which emits at 1550 nm, followed by phase modulator 220 and amplitude modulator 225. The phase modulator advantageously broadens the spectral width of the laser radiation to 2.5 GHz to partially suppress SBS. (Further broadening can degrade system performance.) The amplitude modulator, using an optical modulation depth of, e.g., 3.3% per channel, encodes on the laser beam the information content of, e.g., 77 AM-VSB video channels 230. Source 200 produces a fiber-coupled power of 17 dBm with a CNR of 55 dB, a CSO of −70 dBc, and a CTB of −70 dBc.

Fiber span 205 has, exemplarily, a dispersion of +17 ps/nm-km, an effective area of 70 square micrometers, a length of 60 km, and a span loss of 18 dB.

Significantly, Raman pump source 235 injects, e.g., 300 mW of pump radiation at 1455 nm into the output end of span 205 in the propagation direction counter to the signal.

If pump source 235 is shut off, and instead, span 205 is power compensated to raise the CNR (as described above), the SBS threshold will be surpassed, and there will result at least −15 dB of reflected optical power.

As noted, cross-phase modulation (CPM) is one troublesome non-linear effect. CPM is especially troublesome at high data rates, and at all data rates in fibers having relatively high dispersion, such as local dispersion greater than 10 ps/nm-km. (Strictly speaking, what is meant here is group-velocity dispersion.) Very briefly, amplitude variations in signals propagating in WDM systems induce phase distortion on co-propagating channels, via an effect referred to as the Kerr non-linearity. Dispersion converts this phase distortion into amplitude distortion that tends to impair system performance. Because different wavelength channels generally have different group velocities, the bits in co-propagating channels tend to walk through each other during transmission. In principle, the CPM phase distortion can be wholly or partially canceled during the full course of this walk-through. However, if the respective group velocities differ by very little, the walk-through will be prolonged and in the meantime, significant fiber attenuation may be suffered. In such a case, there may not be effective cancellation. Thus, as channel spacings are reduced, the amount of effective cancellation tends to decrease, and the amount of CPM that survives tends to increase. Cancellation of the CPM phase shift will also be incomplete if pulses in adjacent channels partially overlap at the beginning of a span.

A resonance phenomenon involving CPM in multiple-span systems has been observed. Very briefly, the phase distortion induced between bits of a pair of co-propagating signals upon entry into one span will be augmented if the distorted bit coincides with another bit of the interfering channel upon entry to the next span. Resonance peaks in the bit-error rate of the system are predicted at certain positions in a scan of the bit rates (with channel separation held constant), and at certain positions in a scan of the channel separation (with bit rate held constant).

This resonance phenomenon is described in detail in U.S. patent application Ser. No. 09/153,605, filed on Sep. 15, 1998 by A. R. Chraplyvy et al. under the title, "Wavelength Division Multiplexed System Having Reduced Cross-Phase Modulation" (CHRAPLYVY), commonly assigned herewith, and hereby incorporated by reference. CHRAPLYVY discusses certain techniques for reducing CPM. These include the use of variable clock phase differences. The clock phase difference is the time delay between bit transition times of a pair of channels. To suppress CPM, the clock phase difference for a pair of interfering channels is set differently at the inputs to different spans.

Other techniques discussed in CHRAPLYVY include adding different lengths of dispersion-compensating fiber to different spans, varying modulation bit rates or clock phase delay from channel to channel, and using different wavelength-selective phase delays for each channel.

Figure 4:
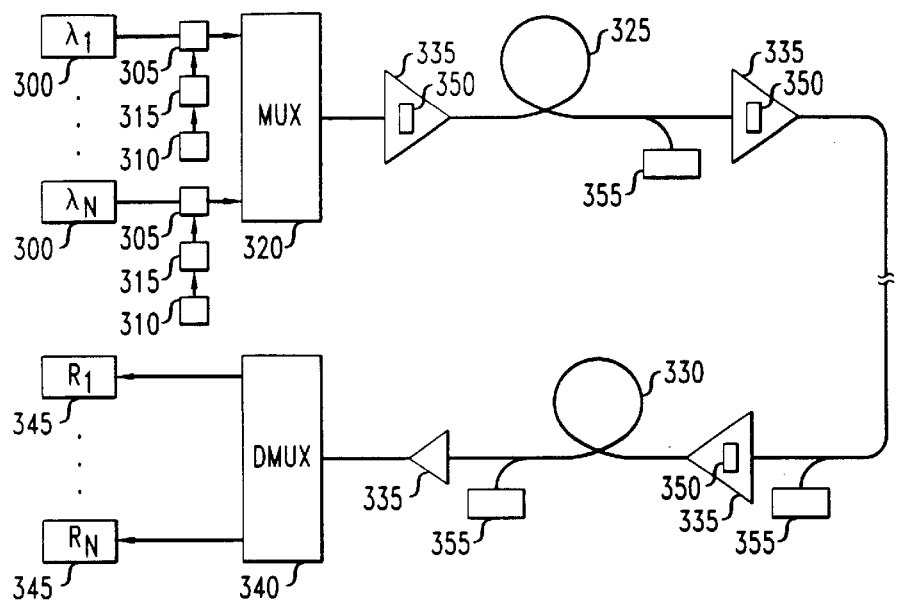
FIG. 4 is a schematic diagram of an illustrative optical fiber communication system according to an illustrative embodiment of the present invention. The system of FIG. 4 is of a kind that includes elements for reducing cross-phase modulation (CPM).

Features of an optical communication system of the kind discussed in CHRAPLYVY are illustrated in FIG. 4. Included are optical sources 300, radiating at respective wavelengths $\lambda_1$–$\lambda_N$, and each modulated, in a respective modulator 305, by a data signal generated in a respective data signal source 310. Advantageously, a respective delay circuit 310 adds a delay, or phase shift, to the corresponding data signal. By varying the amount of such delay among the data signals, it is possible to reduce the accumulation of CPM in the system. Multiplexer 320 combines the outputs of the respective modulators to form a WDM signal for transmission over one or more fiber spans. Shown in full are the first fiber span 325, and the last fiber span 330. Each fiber span begins and, as illustrated here, also ends, at a discrete optical amplifier 335. Demultiplexer 340 receives the WDM signal from the last span and distributes it, by wavelength channel, into respective optical receivers 345. Advantageously, a wavelength delay circuit 350 imposes a respective variable delay in each span. Although such a circuit can be placed at any point along the span, it is particularly advantageous to situate it, as shown here, between stages of the optical amplifier at the beginning of the span that is affected.

Additional benefits are attained by applying the principles of the present invention to a system such as that of FIG. 4. Accordingly, also shown in the figure are, e.g., Raman pump sources 355 for providing remotely pumped amplification in the various fiber spans. A discrete amplifier 335 provides signal gain at the beginning of each fiber span, but each Raman (or other remote) pump provides signal gain in fiber portions substantially situated downstream of that discrete amplifier. Because of the remotely pumped amplification, it is possible to reduce the gain, and thus the signal injection power, at the beginning of each span, where CPM tends to be most troublesome.

We believe that for purposes of suppressing CPM, our invention will be most valuable in connection with WDM systems having at least two fiber spans in which local dispersion is greater than 10 ps/nm-km, and operating with at least one pair of wavelength channels spaced less than 200 GHz apart.

EXAMPLE

Figure 5:
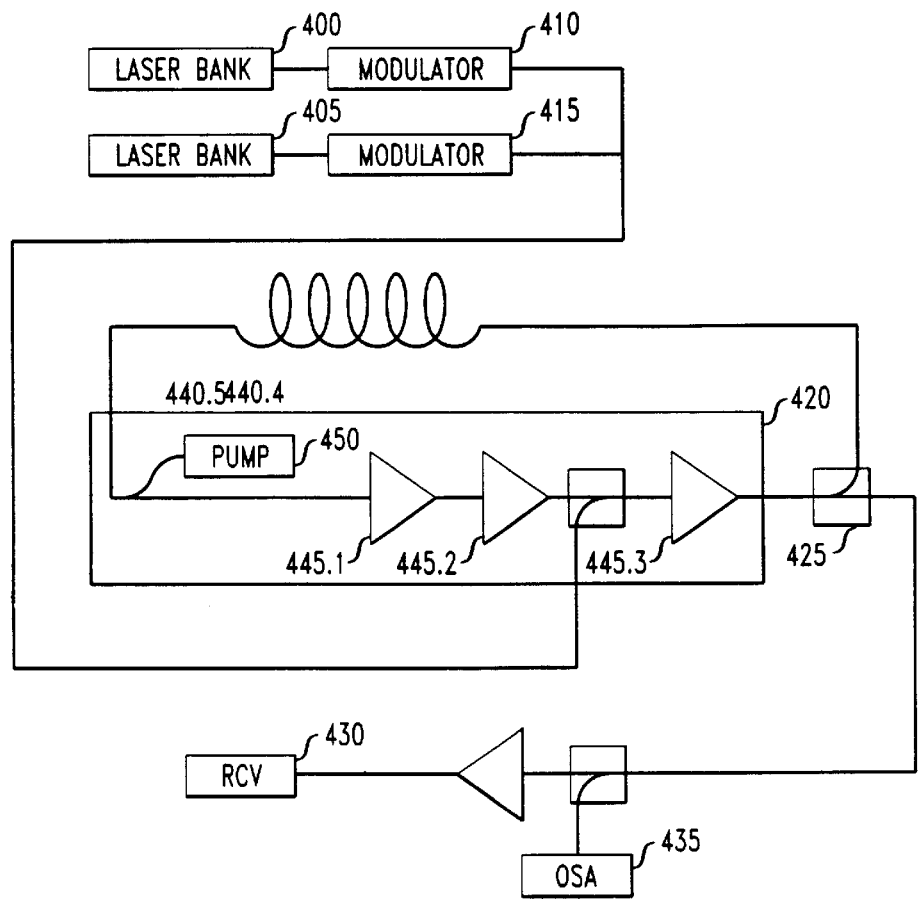
FIG. 5 is a schematic diagram of a laboratory prototype optical fiber communication system used for demonstrating certain principles of the present invention.

The first and second experiments described above were carried out using the laboratory prototype illustrated in FIG. 5. Forty-nine laser sources spanning the wavelength range 1541.75 nm–1561.01 nm at 50-GHz intervals were arranged in two banks 400, 405. The lasers were staggered such that one bank contained odd-numbered channels only, and the other contained even-numbered channels only. All lasers in each bank were modulated by a respective Mach-Zehnder modulator 410, 415. Using these modulators, data in the form of $2^{31}$–1 pseudo-random bit sequences were encoded at a rate of 10 Gb/s. The combined output from modulators 410 and 415 was launched into a fiber loop, which included hybrid amplifier 420. At the output of amplifier 420, optical 10% coupler 425 diverted a portion of the signal to receiver 430 and optical spectrum analyzer 435. The fiber span included five sections 440.1–440.5 of dispersion-shifted fiber having an effective cross-sectional area of about 50 square micrometers. The respective length and zero-dispersion wavelength of each section were as follows: Section 440.1, 23.025 km and 1547.8 nm; Section 440.2, 10.468 km and 1549.9 nm; Section 440.3, 16.794 km and 1578.5 nm; Section 440.4, 15.712 km and 1549.7 nm; Section 440.5, 17.795 km and 1547.4 nm.

Hybrid amplifier 420 included a distributed first stage employing Raman gain in the transmission fiber, followed by three erbium-doped fiber amplifier stages 445.1–445.3. (The Raman source pump is designated in the figure by reference numeral 450.)

Figure 6:
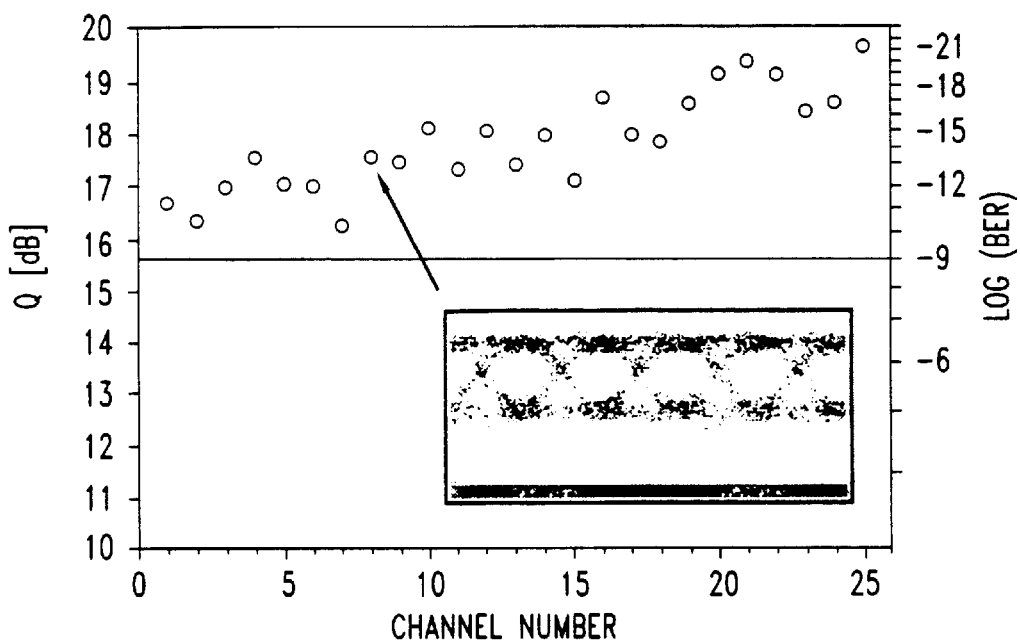
FIG. 6 is a graph of Q-value (measured in decibels on the left-hand vertical scale) and bit-error rate ("BER," measured on the right-hand vertical scale) versus channel number. These measurements were taken in the course of a 25-channel experiment using the prototype illustrated in FIG. 5.

In the first experiment, discussed above, 25 channels, equally spaced by 100 GHz, were transmitted through eight loops. Because all channels were encoded by one modulator, a section of dispersion compensating fiber having a dispersion of –82 ps/nm-km was inserted, before injection into the loop, to decorrelate neighboring channels. Prior to reception, all channels experienced +160 ps/nm dispersion. FIG. 6 shows the measured Q-value and the corresponding bit-error rate (BER) for the 25 channels in this experiment.

Figure 7:
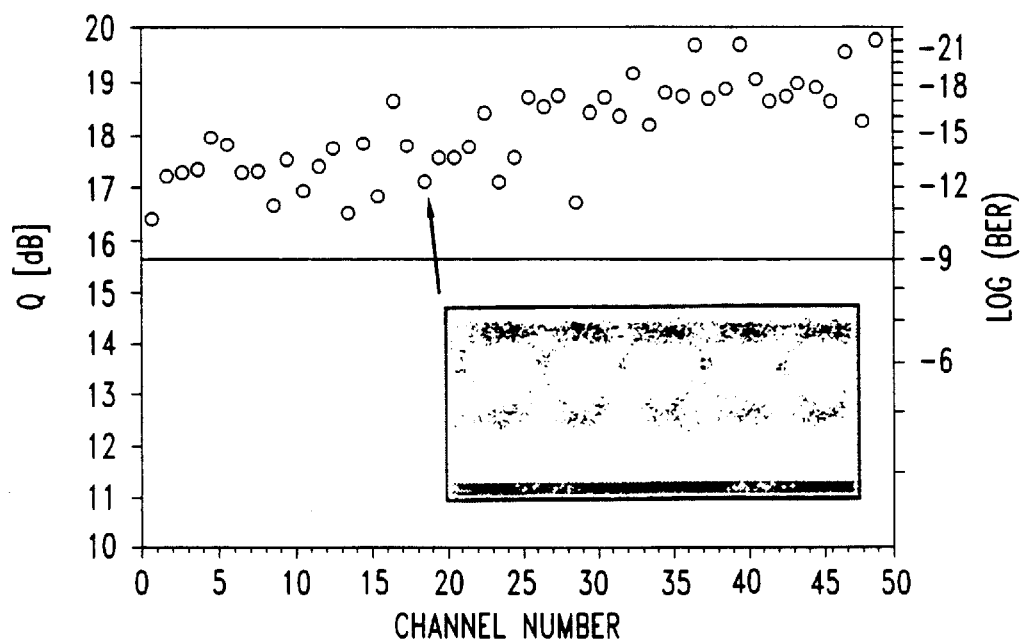
FIG. 7 is a graph of Q-value (measured in decibels on the left-hand vertical scale) and bit-error rate ("BER," measured on the right-hand vertical scale) versus channel number. These measurements were taken in the course of a 49-channel experiment using the prototype illustrated in FIG. 5.

In the second experiment, discussed above, all 49 channels were transmitted through four loops. FIG. 7 shows the measured Q-value and the corresponding bit-error rate (BER) for the 49 channels in this experiment.

What is claimed is:

1. A method for operating a DWDM communication system comprising a plurality of optical fiber spans separated by repeater units, wherein: each repeater unit injects an optical signal having plural wavelength channels into the span that follows it at a respective injected signal power level; the system has a design requirement that a target signal-to-noise ratio (SNR) must be met or exceeded at the end of each span; and the system is subject to non-linear optical effects leading to errors in interpretation of the received signal that are related to signal statistics by a quality factor Q such that higher Q is associated with lower bit error rate (BER); the method comprising:

injecting the optical signal into at least one span at an injected power level that falls short by a shortfall ΔP of the power needed to reach the target SNR at the end of that span, wherein ΔP is selected to raise Q in every channel by at least 2 dB; and compensating for said shortfall by applying remotely pumped, distributed amplification to the optical signal within said at least one span.

2. The method of claim 1, wherein:

there is a data rate for sending optical signals;

optical signals are sent in at least two channels; and there is at least one pair of channels carrying optical signals that are separated in frequency by no more than 200 times the data rate.

3. The method of claim 1, wherein the optical fiber spans of the communication cable consist of zero-dispersion dispersion-shifted fiber.

4. The method of claim 1, wherein the remotely pumped, distributed amplification is carried out by Raman amplification.

5. The method of claim 1, wherein the signal injection comprises amplifying the optical signal in an erbium-doped fiber amplifier.

6. The method of claim 1, wherein:
the optical signal transmitted through at least one span is amplified by a remotely pumped Raman amplifier before reaching the end of the span, and then amplified by an erbium-doped fiber amplifier after reaching the end of the span.

7. The method of claim 1, wherein:
the optical signal comprises data sent in at least 25 wavelength channels;
the frequency separation between each adjacent pair of said 25 channels is no greater than 100 GHz;
the target SNR level is at least 20.7 dB; and
$\Delta P$ is selected to achieve a Q in each of the 25 channels of at least 16.3 dB.

8. The method of claim 1, wherein:
the optical signal comprises data sent in at least 25 wavelength channels;
the frequency separation between each adjacent pair of said 25 channels is no greater than 100 GHz;
the target SNR level is at least 20.7 dB;
$\Delta P$ is selected to achieve a Q in each of the 25 channels of at least 16.3 dB; and
at the beginning of each span, the signal is injected with an injected power level in each channel of no more than 4.1 dBm.

9. The method of claim 1, wherein:
said non-linear effects include four-wave mixing (FWM);
at the end of each span, the optical signal contains a power level of FWM product in each wavelength channel; and
$\Delta P$ is selected to reduce FWM in at least one wavelength channel, with the result that in every channel, the FWM product accumulated over all spans stands in a ratio of less than −15 dB to the total signal level in that channel.

10. The method of claim 1, wherein the optical signal comprises data sent on at least 25 wavelength channels, and said 25 channels are equally spaced by a frequency spacing of no more than 200 GHz.

11. The method of claim 1, wherein there is at least one pair of channels carrying optical signals that are separated in frequency by no more than 200 GHz, and the local dispersion in at least one wavelength channel is less than 3 ps/nm-km.

12. The method of claim 1, wherein there is at least one pair of channels carrying optical signals that are separated in frequency by no more than 200 GHz, and the local dispersion in at least one wavelength channel is less than 1.5 ps/nm-km.

13. The method of claim 1, wherein the optical signal comprises data sent on at least 25 wavelength channels, and said 25 channels are equally spaced by a frequency spacing of no more than 100 GHz.

14. The method of claim 1, wherein the optical signal comprises data sent on at least 25 wavelength channels, and said 25 channels are equally spaced by a frequency spacing of no more than 50 GHz.

15. A method of sending an analog optical signal, occupying one or more wavelength channels, through one or more optical fiber spans of a communication cable, wherein an overall system carrier-to-noise ratio (SYSTEM-CNR), an overall system composite second-order distortion value (CSO), and an overall system composite triple beat value (CTB) for each wavelength channel are associated with the signal as output by the communication cable, and wherein each span, including a last span, has a beginning and an end, the method comprising:

a) injecting the optical signal at the beginning of each span with sufficient power to attain a respective operating level of carrier-to-noise ratio (CNR) at the end of each span; and b) in at least one span, to be referred to as an RP span, subjecting the optical signal to remotely pumped amplification (RPA) which cooperates with the signal injection so as to attain the operating CNR level at the end of that span;

and wherein there is at least one sequence of the last one or more RP spans;

and wherein the cooperation between the signal injection and the RPA is such that, in at least one wavelength channel:

(i) the optical signal is injected at the beginning of said at least one span with less power than would be needed to attain the operating CNR level at the end of an otherwise equivalent span lacking RPA; and (ii) at least one of SYSTEM-CNR, CSO, and CTB is at least 2 dB better than the corresponding value that would be reached, at the same operating CNR levels at the ends of the respective spans, by an otherwise equivalent communication cable lacking RPA in at least one said sequence.

16. The method of claim 15, wherein:
in at least one wavelength channel, the injected optical signal-power level that would be needed to attain the operating CNR level at the end of a span lacking RPA, but otherwise equivalent to said at least one span, is greater than 6 dBm; and
in said channel, stimulated Brillouin scattering (SBS) gives rise to less than −15 dB of reflected optical power.

17. The method of claim 1, wherein:
the optical signal comprises data in 25 or more wavelength channels spaced apart by 100 GHz or less and sent at a rate of at least 10 GHz in each channel; and
$\Delta P$ is further selected to reduce BER in every said wavelength channel to less than $3 \times 10^{-11}$.

* * * * *